United States Patent [19]
Landeta

[11] Patent Number: 5,151,953
[45] Date of Patent: Sep. 29, 1992

[54] SINGLE CHIP 2-D CONVOLVER

[75] Inventor: David S. Landeta, Palm Bay, Fla.

[73] Assignee: Harris Corporation, Melbourne, Fla.

[21] Appl. No.: 624,964

[22] Filed: Dec. 10, 1990

[51] Int. Cl.[5] .............................................. G06K 9/64
[52] U.S. Cl. ...................................... 382/41; 382/42;
382/27; 364/728.01
[58] Field of Search ............... 382/42, 41, 27; 358/30;
364/724.12, 728.01

[56] References Cited

U.S. PATENT DOCUMENTS

| | | | |
|---|---|---|---|
| 3,872,290 | 3/1975 | Crooke et al. | 235/152 |
| 3,980,873 | 9/1976 | Mattei | 235/156 |
| 4,718,091 | 1/1988 | Kobayashi et al. | 382/41 |
| 4,720,871 | 1/1988 | Chambers | 382/42 |
| 4,747,157 | 5/1988 | Kurakake et al. | 382/41 |
| 4,791,677 | 12/1988 | Mori et al. | 382/41 |
| 4,937,774 | 6/1990 | Malinowski | 364/724.12 |
| 5,005,149 | 4/1991 | Elleaume et al. | 364/728.01 |
| 5,027,423 | 6/1991 | Kawata et al. | 382/54 |

OTHER PUBLICATIONS

"IMS ALLO Image and Signal Processing Sub-System" by Inmos Corporation, Aug. 1987, pp. 1-23.
"L64243 3×3 Multibit Filter (MFiR3)" by LSI Logic Corporation, Feb. 1988, pp 1-12.
"Two-Dimensional Convolution Processor" by H. Baier et al; IBM Technical Disclosure Bulletin, vol. 26, No. 9, Feb. 1984.
"Board Power Chase Mystique, expense from Image Processing" by M. Leonard; Electronic Design Report, Sep. 1987, pp. 93-102.
"Frame-grabber Boards Acquire and Process Images in Real Time" by Preston et al; EDN, Sep. 1986; pp. 273-278.
"Board Level Image Processors Enter Desktop Arena" by T. Williams; Computer Design, Jun. 1986, pp. 25-30.
"An Economical Powerful System for Video-Enhanced Microscopy" by B. Maranda; American Laboratory Apr., 1987.
"LSI Software Implements Signal Processing Algorithms" by W. Finn, vol. 19, No. 3 Mar. 1980, pp. 137-142.

Primary Examiner—Leo H. Boudreau
Assistant Examiner—Andrew W. Johns
Attorney, Agent, or Firm—Barnes & Thornburg

[57] ABSTRACT

A convolver including a matrix of multipliers for providing a plurality of products $P_iC_j$ of input data $P_i$ and a dedicated coefficient $C_j$ and each connected to a data input by a buffer which stores and delays input data $P_i$ as a function of its position in the matrix and the length of the row M of the input data array. The buffers include row buffers which are programmable for various input data array row lengths M as well as programmable input buffer stages. A second data input is selectively connected to the multipliers or to an output adder for connection to external delay units or cascade connection to other convolvers. Unique control logic is provided to change the structure of the convolver as well as reset and program various elements using common inputs.

35 Claims, 8 Drawing Sheets

SINGLE CHIP 2-D CONVOLVER

BACKGROUND AND SUMMARY OF THE INVENTION

The present invention relates generally to matrix processors and more specifically to matrix processors of images.

Modern image processing frequently requires that a massive number of repetitive computations be performed on a single array of picture elements (pixels) before they are displayed. The purpose of these computations is to enhance the contents of a single picture frame, or modify them to suit a specific image analysis objective. The two most common classes of pixel operations are the pixel-point operations and pixel-group operations. Pixel-point operations are considerably less computation-intensive than the pixel-group operations; they usually call for simple arithmetic or logic operations to be performed on each pixel of the frame. On the other hand, pixel-group operations usually involve a square or rectangular window (convolution kernel) of neighboring pixels upon which a set of arithmetic operations is to be performed. This set of operations is repeated for each pixel of the frame.

The value of the pixel usually indicates the intensity of a specific RGB video component for chromatic applications, or a gray scale value of monochromatic applications (such as radar signal processing or image recognition).

It is the pixel-group operations that have, to date, established the limits of real-time image processing speeds. The most common pixel-group operation in image processing is a so-called spatial convolution, i.e. a process of multiplying selected neighboring pixels by a set of values called a convolution coefficient kernel followed by the summation of the results. For instance a typical application, a set of, say, 9 pixels is arranged as a $3 \times 3$ matrix:

$$\begin{array}{ccc} P(x-1,y-1) & P(x,y-1) & P(x+1,y-1) \\ P(x-1,y) & P(x,y) & P(x+1,y) \\ P(x-1,y+1) & P(x,y+1) & P(x+1,y+1) \end{array}$$

where x and y indicate pixel's coordinates in the frame array. Each pixel's K-bit value (where K usually lies in the 6–12 bit range) of such a $3 \times 3$ array is then multiplied respectively by an M-bit coefficient value (where M can be typically 6–16 bit value) from the $3 \times 3$ coefficient kernel:

$$\begin{array}{ccc} A & B & C \\ D & E & F \\ G & H & I \end{array}$$

The matrix above is called the convolution kernel, and each of its elements is referred to as convolution coefficient. Finally, after all 9 multiplications are completed, their results are then summed to yield the new value of the pixel in the location x,y:

$$NEWP(x,y) = P(x-1,y-1)A + P(x,y-1)B + \\ P(x+1,y-1)C + P(x-1,y)D + P(x,y)E + P(x+1,y)F + \\ P(x-1,y+1)G + P(x,y+1)H + P(x+1,y+1)I$$

The new value of the pixel NEWP(x,y) usually corresponds to the modified value of its amplitude (gray scale). The entire process described above is called "2-D spatial filtration" or "2-D spacial convolution" and corresponds to a discrete two-dimensional filtration of the image in the time domain. Depending on the set of values A . . . I picked for the convolution kernel, a number of image processing functions can be accomplished. In particular, operations such as image smoothing, edge detection or extraction, or contrast enhancement can be accomplished. If all kernel coefficients except for the middle one (E) are picked equal to each other, or all nine of them are equal, the kernel is referred to as symmetrical. This is a common form of the kernels used in modern image processing. If three or more coefficients in the kernel differ from each other the kernel is called asymmetrical.

Although the use of larger kernels, such as $5 \times 5$, $7 \times 7$ or even $15 \times 15$, is even more desirable (since it increases the bandwidth of convolution), the amount of computations involved in convolution with such large kernels is often prohibitive for most applications. Since industry standard frame array sizes vary from $256 \times 256$ pixels to $4096 \times 4096$, the number of multiplications and additions which have to be performed for a single frame convolution varies from approximately 600,000 to almost 160 million per frame. Consequently, if the frames are to be convolved in real time (i.e. processed at the same rate, or faster, than they are acquired and digitized), the total frame convolution time puts an obvious restriction on the image acquisition time. Thus, for example, if the industry standard medium resolution image of $512 \times 512$ is to be acquired and convolved using $3 \times 3$ kernel, almost 2.5 million multiplications and additions will have to be performed. If a single eight-bit multiply/accumulate operation is assumed to require 50 nanoseconds using off-the-shelf multiplier-accumulater (MAC), the total amount of time required to complete a single frame convolution will be 0.125 seconds. This, in turn, would imply that the maximum frame repetition rate would be limited to 8 Hz, a rate too slow for most industrial and commercial applications typically requiring at least a 30 Hz frame repetition rate.

Consequently, most modern processors do not offer real-time $3 \times 3$ convolution capabilities. On the other hand, in most industrial and military applications, the frame repetition rates vary from 30 Hz (interlaced NTSC standard) to as fast as 400 Hz. This implies that for $512 \times 512$ pixel arrays total frame convolution times in the millisecond range are needed. In practice, such convolution speeds have rarely been accomplished and only in board-level designs. ECl-based designs can meet such requirements.

Thus, it is an object of the present invention to provide a matrix processor capable of real-time processing.

Another object of the present invention is to provide a matrix processor which can do real-time convolution of $3 \times 3$, $5 \times 5$ and other kernels.

Still a further object of the present invention is to provide an image processor capable of doing kernel convolutions of matrix from $N \times M$ to multiples of that array.

These and other objects are obtained by a system for $Q \times R$ kernel convolution of a $M \times N$ array of words. The system includes an input receiving the words P from the $M \times N$ array and coefficient storage for storing the coefficient $C_1$ through $C_{Q \times R}$. A matrix of $Q \times R$ multipliers each have a first input for receiving a word $P_i$ and a second input for receiving a dedicated coeffient Cj for producing a product PiCj. An adder is connected to the output of the plurality of multipliers for adding the products to provide an output convolution at a first or product output.

A plurality of buffers connect the word inputs to respective multipliers for storing one or more words and delaying the input of the word to a respective multiplier as a function of its position in the $Q \times R$ matrix and the row length M of the $M \times N$ array. The input structure is connected to the first multiplier of the row without a buffer. The multipliers in the matrix have a row input with the first row being connected to the input structure and the other rows' inputs are connected to the row input of a preceding row by a row buffer having M stages. Each of the multipliers within a specific row is connected to the row input by a buffer having a stage for each position it is spaced from the first position. Alternatively, the row buffer would have $M-R+1$ stages and each of the multipliers in a row would be connected to the preceding multiplier by a single stage buffer.

In either embodiment, the row buffer is programmable for different values of M. This allows the system to handle different values of word arrays without modification of multiplier structure. A cascade output as well as the product output may be provided representing the total delay or number of stages through the $Q \times R$ matrix. Depending upon the embodiment, it is either out of the last multiplier or out of the last row buffer.

The input may be through an arithmetic logic unit and through programmable stages of delay. A second input or cascade input is provided and is connected to the rows other than the first row through a multiplexer. The other input to the multiplexer is from the row buffers. The multiplexer would provide that the input word be connected to the first row with the other rows receiving either their inputs from the row buffers or from the cascade inputs. This allows versatility of the base kernel $Q \times R$ to be used in a structure for larger kernels or larger word arrays. A summer for each row R provides a sum of the products of its respective row to an output adder. The output adder provides the output convolution Pcout. The second or cascade input may also provide sums from other kernel stages to the output adder. A pair of coefficient stores are provided and a multiplexer chooses which store is being provided as an input to the multiplier matrix.

The system is converted to a $(Q \times R) \times 1$ convolution by programming the row buffers to Q stages. Arrays larger than $M \times N$ may be handled by a single system for $Q \times R$ kernel convolution by providing additional external row buffers connected to the second inputs. Alternatively a plurality of $Q \times R$ kernel convoluting systems may be cascaded. For different size kernels other than $Q \times R$, the basic $Q \times R$ convoluting system maybe cascaded and selective coefficients set to zero.

Where the convolution kernel is larger than the convolver cell, the convolver cells may be arranged in a group of rows and columns. The cascade input of each convolver is connected to a product output of a previous convolver in its respective row. The cascade input of the first convolver of each row is connected to a product output of the last convolver of a previous row. The data input of each convolver is connected to a cascade output of a previous convolver in its respective column. The input of the convolvers of the first row are connected to the data input of the first convolver by appropriate delays. The delays may be external or part of the internal programmable input delay stages. The appropriate convolution kernel as well as variation in the matrix of the input can be controlled using appropriate coefficient to the individual convolvers.

Other objects, advantages and novel features of the present invention will become apparent from the following detailed description of the invention when considered in conjunction with the accompanying drawings.

DETAILED DESCRIPTION OF THE DRAWINGS

One of the most frequently encountered operations in image processing systems is 2-D convolution, or kernel convolution. This is a pixel group operation which is used to perform image filtering functions such as: edge extraction, feature enhancement, smoothing, or any combination of these. Until recently, only board level systems were available to handle the extraordinary computing requirements encountered in 2-D convolution. Today there are just a handful of IC's which address this challenge, and only a few offer a single chip solution. The present convolver accelerator, is a single chip alternative to $3 \times 3$ kernel convolution, while being versatile enough to handle larger convolution tasks through cascadability, and 1-D convolution through programmability.

Although the description will address mainly high speed 1-D or 2-D digital convolution, the present convolver can be used for many other real time image processing and enhancement, robotics and computer vision, and radar signal processing applications.

The convolver is a cascadable IC that is capable of performing real time kernel convolution. As a single IC, it can perform $3 \times 3$ kernel convolution on up to a $1k \times N$ frame of pixels. It will accept the pixels in non-interlaced raster scan order at a clock rate up to 40 MHz. The convolved image will be available at the outputs in the same raster scan order it was received beginning after the 3rd pixel of the 3rd row has been accepted. Processing is complete only one cycle after the last pixel has been accepted, or after 1k×N cycles, where N is the number of rows in the frame. Thus, at a 40 MHz pixel clock rate, an entire 512×512 image is processed in under 7 milliseconds, with the first new pixel available after only 26 microseconds, while a 1k×1k image is convolved in 27 milliseconds, with the first pixel available after only 51 microseconds.

The convolver includes on-chip row buffers which can be programmed to any desired depth, up to 1024 pixels. This allows for convolution on non-standard, user defined row sizes, and also provides 9-tap one-dimensional (1-D) filtering capabilities. An ALU and a Shifter are also included in the pixel data path to allow pixel point operations to be performed on the incoming data.

Cascadability allows multiple convolvers to be used for frames larger than 1024 pixels per row, and also for kernels larger than 3×3. There is also an option allowing it to interface with external row buffers, giving the user a low cost method for convolving larger frames.

Although the convolver will be described as a 3×3 kernel, this by way of example and the basic convolver unit may be considered a Q×R kernel convolver. Similarly, the pixel array first example has been a 512×512 array but may also be considered a generic M×N array. Wherein the basic convolver unit is used in array to increase the kernel beyond its Q×R capacity, this kernel array will have the generic notation of S×T.

Figure 1:
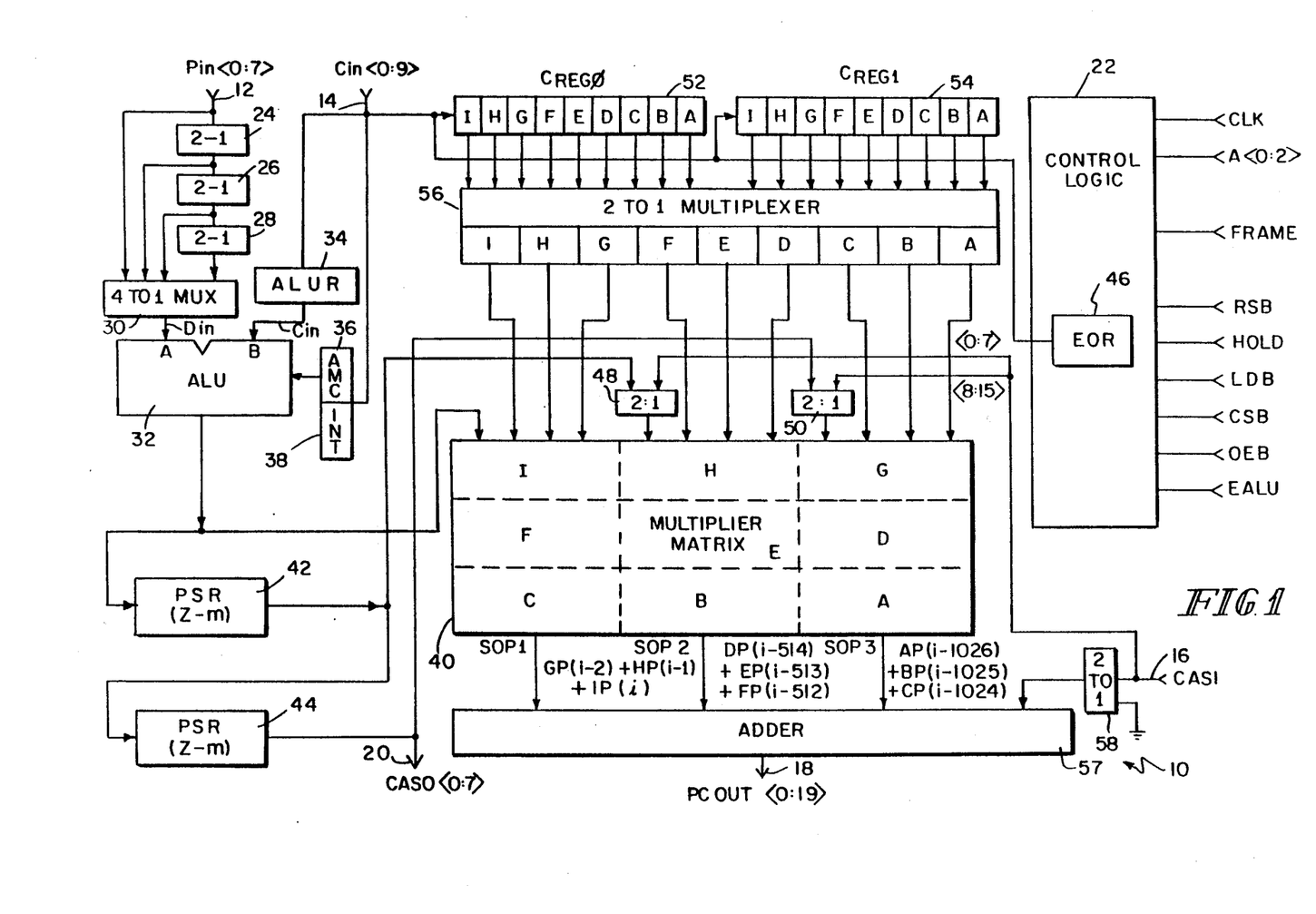
FIG. 1 is a block diagram of a convolver incorporating the principles of the present invention and illustrated as a $3 \times 3$ kernel.

The convolver 10, as illustrated in FIG. 1, includes input port 12 for the pixel data Pin and input port 14 for the coefficient Cin. An additional input CASI is generally used for cascading at port 16. The outputs of the convolver 10 include the convoluted kernel Pcout at port 18 and a cascading output CASO at port 20. A control logic 22 then receives a plurality of inputs to be described in more detail below. The pixel data input port 12 is connected to a plurality of cascaded buffers 24, 26 and 28 whose outputs are connected through a 4 to 1 multiplexer 30 as a first input Din to the arithmetic logic unit ALU 32. The control logic unit 22 selects the amount of delay of the pixel input Pin to the ALU 32. Although multiplexer 30 is shown, the buffers 24, 26, and 28 may be programmably selected.

The coefficient port 14 in addition to providing coefficients to be used in the multipliers, may also provide the second input to the ALU 32 through a register ALUR 34. By storing the second input to the ALU in ALUR 34, not only can the coefficient input 14 be used for other functions, but a fixed value can be maintained in the ALUR 34 for many cycles or frames. The coefficient input 14 may also be used to provide ten bits of microcode to AMC register 36 and nine bits of instruction code to INT register 38. A typical example of the microcodes used in the ALU and stored in AMC register 36 is shown in Table 1.

TABLE 1

| Pixel Point (ALU) OPERATIONS | | | |
|---|---|---|---|
| AMC REG 7-LSB's | Operation | AMC REG 3-MSB's | Operation |
| 0000000 | Logical (0) | 000 | No Shift |
| 0001000 | Logical (A AND B) | 001 | Shift Right 1 |
| 0010000 | Logical (A AND B) | 010 | Shift Right 2 |
| 0011000 | Logical (A) | 011 | Shift Right 3 |
| 0100000 | Logical (A AND B) | 100 | Shift Left 1 |
| 0101000 | Logical (B) | 101 | Shift Left 2 |
| 0110000 | Logical (A XOR B) | 110 | Shift Left 3 |

TABLE 1-continued

| Pixel Point (ALU) OPERATIONS | | | |
|---|---|---|---|
| AMC REG 7-LSB's | Operation | AMC REG 3-MSB's | Operation |
| 0111000 | Logical (A OR B) | | |
| 1000000 | Logical (A NOR B) | | |
| 1001000 | Logical (A XNOR B) | | |
| 1010000 | Logical (B) | | |
| 1011000 | Logical (A OR B) | | |
| 1100000 | Logical (A) | | |
| 1101000 | Logical (A OR B) | | |
| 1110000 | Logical (A NAND B) | | |
| 1111000 | Logical (1) | | |
| 0110001 | SUM (A plus B) | | |
| 1001010 | DIFF (A minus B) | | |
| 1001100 | DIFF (B minus A) | | |

By using different bits for the ALU logic operation from the shifting operation, both types of operations may be performed in combination. A default condition of the AMC register 36 is bypass which is Logical (A) with no shift.

A typical example of the nine bits of instructions in the INT register 38 are shown in Table 2.

TABLE 2

| BIT | INSTRUCTION REGISTER |
|---|---|
| Cin <0> | cascade input mode; i.e. internal or external row delays |
| Cin <1:2> | number of input delays at the Din input bus |
| Cin <3> | number format, for Pin unsigned or 2's complement |
| Cin <4> | number format, for Cin unsigned or 2's complement |
| Cin <5:6> | type of rounding performed on Pcout, i.e. no rounding, 16 bit rounding and 8 bit rounding |
| Cin <7:8> | number of shift for CASI. i.e. None, 2, 4, 8 |

The first bit Cin <0> selects either internal row delays using programmable row delays 42 and 44 or external row delays as received on the cascade input 16. This selection is executed by multiplexers 48 and 50. The second and third bits Cin <1:2> select the number of input delays by controlling multiplexer 30 or direct control of input delay stages 24, 26 and 28. The fourth bit Cin <3> signifies the input and output number format of pixels input Pin and output Pcout. The fifth bit Cin <4> signifies the input number format of the coefficients Cin.

The sixth and seventh bits Cin <5:6> determine the type of rounding performed at the output Pcout at port 18. The rounding control of the instruction register will vary depending upon the available length of the convolved output Pcout 18. To increase the resolution of the output 20 bits are shown. Using a sixteen bit round, a one is added internally to the bit position Pcout <3>. When an eight bit round is selected, a one is added to the bit position Pcout <11>. The eight and ninth bits Cin <7:8> define the amount of shifting of the cascade input CASI at port 16. This may be no shift, 2 bit shift, 4 bit shift or an eight bit shift, for example. The default state of the INT register 38 after a reset is all zeros.

The output from the ALU 32 is provided directly to the first row of the multiplier matrix 40 as well as to a first programmable delay stage or shift register 42. The output of programmable shift register 42 is provided to the second row of the multiplier matrix 40 through the multiplexer 48 as well as providing an input to a second programmable shift register 44. The output of the programmable delay stage or shift register 44 is provided to the third row of the multiplier matrix 40 through a multiplexer 50. The second input to the multiplexers 48 and 50 is from the cascade input port CASI 16 As noted in Table 2, the cascade input mode is selected by the first bit of the instruction register 38 to control the multiplexers 48 and 50. For an internal delay, the programmable row buffers 42 and 44 are selected as the input to the multiplier matrix 40, by multiplexers 48 and 50. For external row delays, the input port 16 for the CASI is selected as the input to the multiplier matrix 40, by multiplexers 48 and 50.

The programmable shift registers 42 and 44 can each store up to for example 1024 8-bit pixel values and thus delay the pixels from 0 up to 1024 clock cycles. The delay is represented by a small m which represents the row length of the frame. The desired value m for the programmable shift registers 42 and 44 is stored in end of row (EOR) register 46 in the control logic 22 and is inputted through the coefficient input Cin 14. The binary value stored in the end of row register 46 is interpreted by the control logic 22 and the signal is sent to the programmable row buffers 42 and 44, to provide an offset between the real and write pointers. The default position for the end of row register 46 is a maximum length.

The coefficients are provided at the coefficient input Cin 14 to a first coefficient register CREG0 52 and a second coefficient register CREG1 54. The use of two coefficient registers 52, 54 allows the user to load a new set of coefficients without disturbing the current convolution. A multiplexer 56 selects which coefficient registers are used as the coefficients in the multiplier matrix 40.

The multiplier matrix 40 consists of nine 8×8 multipliers. They are arranged in three vertical rows with each row representing a three-tap 1-dimensional FIR filter. The first input of each of the multipliers is a pixel value or a delayed pixel value while the second input is a coefficient from the coefficient registers. The rows are separated by the row buffers 42 and 44 resulting in a 2-D sum of products. Each row provides its own sum of product outputs SOP1, SOP2 and SOP3. The sum of products are added in a final adder 57 which provides the convolved output Pcout at port 18.

The cascaded input CASI port 16 may also be provided to the adder 57 through a multiplexer 58. The multiplexer 58 includes a register to store the cascade input CASI and buffer the adder 57 from changes on port 16 during a cycle. When the first bit of the instruction register 38 selects internal buffering, multiplexer 58 connects CASI at port 16 to the final adder 57. When the first bit of the instruction register 38 selects cascade or external buffering, multiplexer 58 provides no input. Thus the convolver 10 may receive a cascaded input to be added to its internal generated sum of products SOP1, SOP2 and SOP3. The cascade input CASI on port 14 provided to the final adder 57 may be used to add offset values. This could be used for increasing the brightness of the convolved image as well as other desired effects.

Figure 2A:
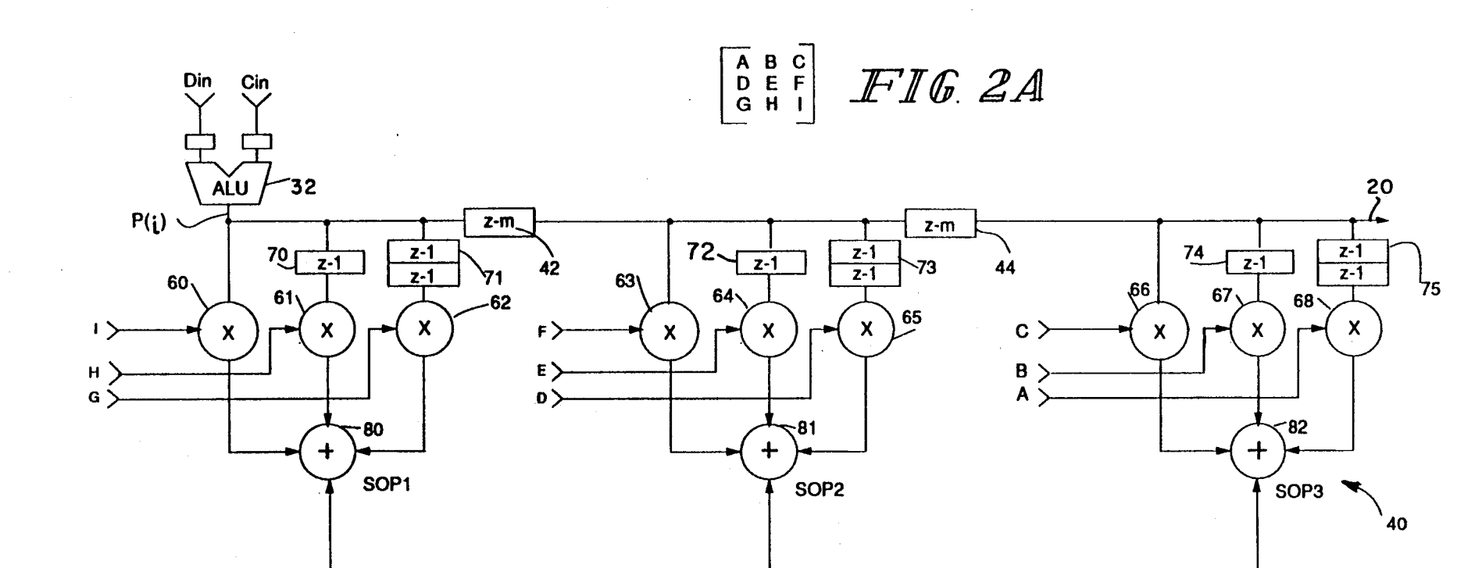
FIG. 2A is a map for a $3 \times 3$ convolver.
Figure 2B:
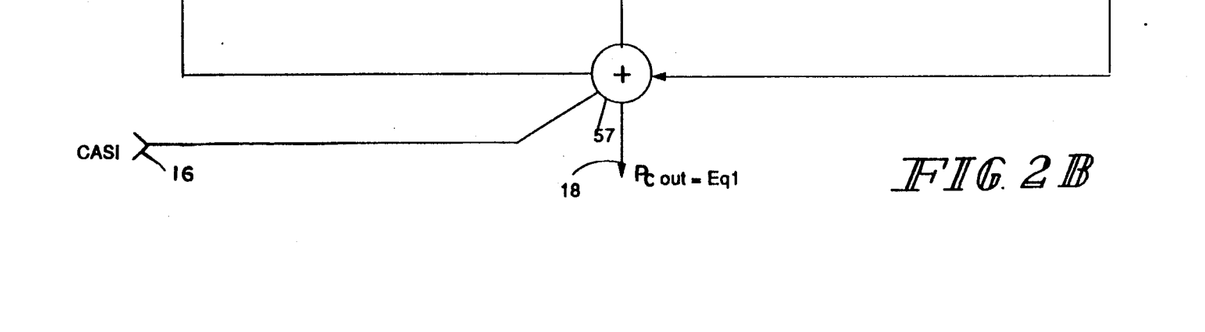
FIG. 2B is a functional diagram of one embodiment of a $3 \times 3$ convolver according to the principles of the present invention.

By selecting the internal row buffers 42 and 44 by bit one in the instructions register 38, the output Pcout at port 18 is represented by Equation 1 and the convolver 10 has a configuration illustrated in FIG. 2B.

$$Pcout(i) = A\ P(i - 2m - 2) + \\ B\ P(i - 2m - 1) + C\ P(i - 2m) + D\ P(i - m - 2) + \\ E\ P(i - m - 1) + F\ P(i - m) + G\ P(i - 2) + 1 +$$
EQUATION 1

-continued
$$P(i - 1) + I\ P(i) - CASI(n)$$

Figure 3A:
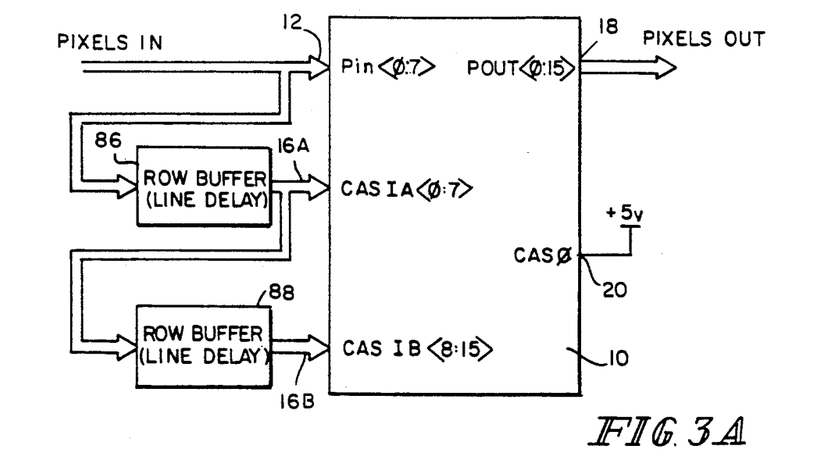
FIG. 3A is a block diagram of the convolver of FIG. 1 used in combination with external row buffers.
Figure 3B:
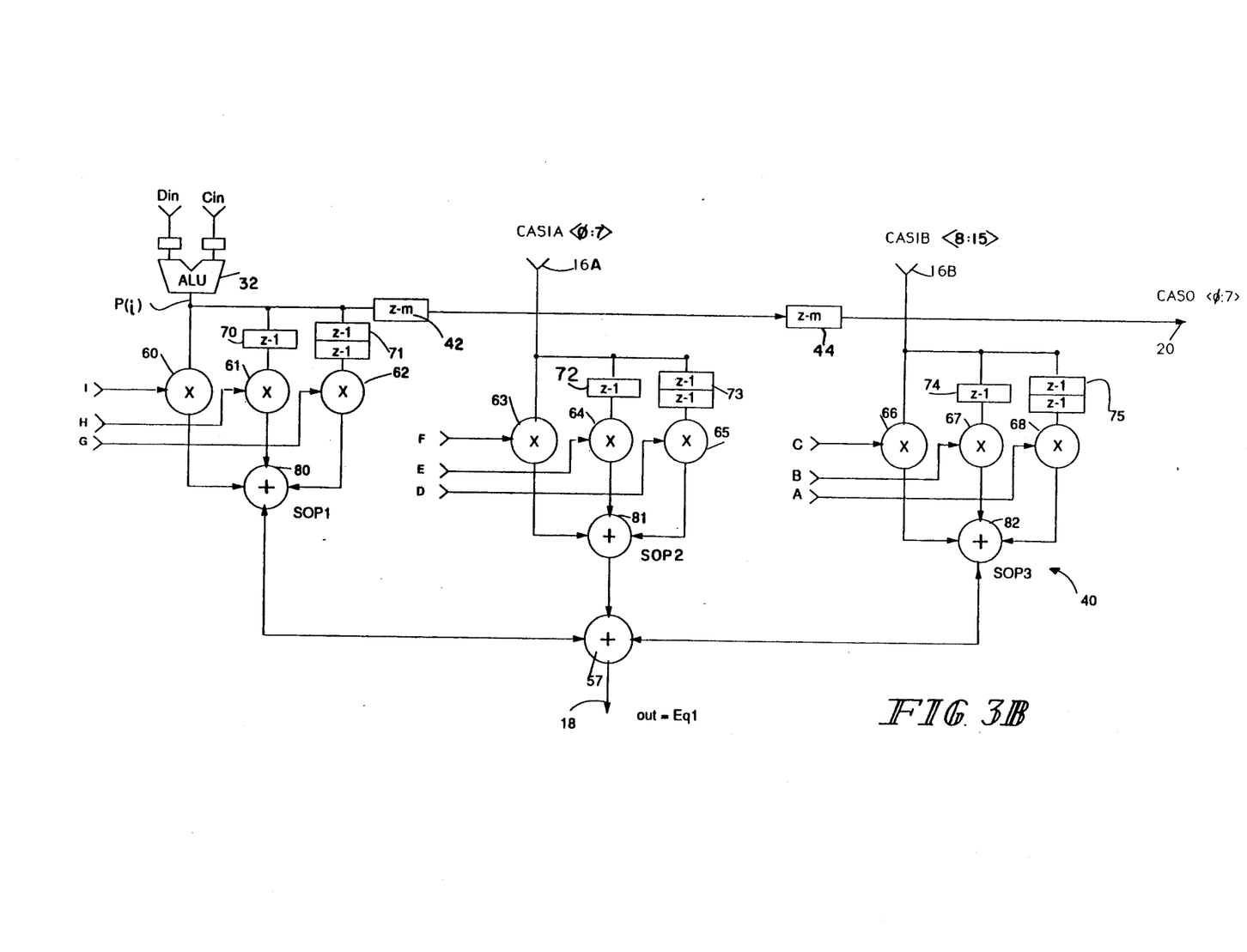
FIG. 3B is a functional diagram of a $3 \times 3$ convolver of the present invention used in its cascade configuration.

If the cascade input CASI 16 is used as the input to the second and third rows of the multiplier 40 by bit one in the instruction register 38, the output Pcout at port 18 will be represented by Equation 2 and the convolver 10 has a configuration illustrated in FIG. 3B.

$$Pcout(i) = A\ CASI\ B(i - 2) + \\ B\ CASI\ B(i - 1) + C\ CASI\ B(i) + D\ CASI\ A(i - 2) + \\ E\ CASI\ A(i - 1) + F\ CASI\ A(i) + G\ P(i - 2) + \\ H\ P(i - 1) + I\ P(i)$$
EQUATION 2

The inputs to the control logic 22 include the clock input CLK which can run at a maximum speed of 40 MHz. The new FRAME input, also known as the vertical sink input, is used to reset all the internal circuitry except for the coefficient registers 52, 54, ALU 32, AMC register 36, EOR register 46 and INT registers 38. Thus after a FRAME reset has occurred, a new frame of pixels maybe convolved without reloading these registers. The reset RSB input resets all the internal circuitry. Thus after a reset occurs all data registers must be initialized or remain at the default value. The input HOLD is used to gate the clock input CLK for all internal circuitry. Thus when HOLD is enabled (high), the CLK has no effect on the processor and the internally stored data registers. This pin is useful for stopping the clock internally during blank periods. The output enable input OEB is used to tristate the convolved output Pcout at port 18. The input EALU enables the ALU 32's B input path. Thus the second pixel input on the coefficient input port 14 is stored in the ALU register 34 and is provided as a second input to the ALU 32.

The loading of the various registers and the selection of the appropriate coefficient using multiplexer 56 is controlled by the three bit input A. The load strobe input LDB enables the function determined by the address A. The chip select input CSB enables or disables the load strobe LDB pin port. Thus, it is not required to externally gate the LDB strobe signal. The various functions controlled by the address A are described in Table 3.

TABLE 3

| A<2:0> | Function |
|---|---|
| 000 | Load EOR Register 46 |
| 001 | Load ALU Microcode is AMC Reg. 36 |
| 010 | Load CREG0 52 |
| 011 | Load CREG1 54 |
| 100 | Load INT Register 38 |
| 101 | Select CREG0 (coef. mask) MUX56 |
| 110 | Select CREG1 (coef. mask) MUX56 |

The default position for multiplexer 56 of the coefficient registers is selection of the first register CREG0 52.

The specific structure of the multiplier 40 will be described with respect to FIGS. 2 and 3 for its two modes of operation, namely internal row buffering and external row buffering. The 3×3 mask illustrated in FIG. 2A is applicable to FIGS. 2 and 3. For the first bit in the instruction register 38 being a 0, the internal row buffers 42 and 44 are used. The configuration of the multiplier matrix is illustrated in FIG. 2B. The output of the ALU 32 is provided directly to the first row which includes multipliers 60, 61 and 62 receiving coefficients I, H and G respectively. Buffers 70 and 71 connect the output of the ALU 32 to respective multipliers. The amount of the delay represents the position in the row from the first multiplier 60. The outputs of the multipliers 60, 61 and 62 are combined in a summer 80 to provide the sum of their partial products SOP1. The output SOP1 of summer 80 is provided to a final adder 57.

The first programmable row buffer delay element 42 connects the output of the ALU 32 directly to its row of multipliers. The first multiplier 63 receives a signal from 42 directly while the multipliers 64 and 65 have appropriate delay stages 72 and 73 depending upon their position from the first multiplier 63. Multipliers 63, 64 and 65 multiply the delayed signals by the coefficients F, E and D respectively and the partial products to summer 81. The output SOP2 of summer 81 is provided to the final adder 57.

The output of the first programmable buffer 42 is connected through row buffer 44 to the next row of multipliers. The output of row buffer 44 is connected directly to multiplier 66 and through appropriate delays 74 and 75, depending upon their position in the row, to multipliers 67 and 68. The multipliers 66, 67 and 68 multiply their respective coefficients C,B and A times the delayed input and provide these partial products to summer 82. The output SOP3 of summer 82 is provided to the final adder 57. The output Pcout of final adder 57 at port 18 is equal to Equation 1.

Each of the rows of equation 1 represents a sum of Partial products SOP1, SOP2 and SOP3. The last term CASI(n) in Equation 1 represents the cascade input provided on port 16. The first bit of the instruction register 38, which selects internal delays also connect the cascade in port 16 through multiplexer 58 to the final adder 57. As will be discussed with respect to FIGS. 4, 5 and 6, cascade input CASI at port 16 is connected to the convoluted product output Pcout of a previous convolver. Thus the results of a prior convolver 10 are added with the present convolver to produce a combined output at port 18.

The cascade output CASO at port 20 is used primarily during cascading to handle larger frames and/or larger kernels. The value of CASO at port 20 represents an accumulation of delays through the convolver 10. In the embodiment illustrated in FIG. 2B, the output CASO represents two row delays or the sum of the delays through buffers 42 and 44. The value m in the buffers 42 an 44 are programmable and represent the row length of the pixel frame of the M×N array.

It should be noted that in FIG. 2B, the delayed data signals to output CASO at port 20 does not represent the total delay through the convolver 10 since the three delays through multiplier stages C,B and A are not included. Thus the input delay stages 24, 26 and 28 of the next convolver in the array must be programmed to be active to accommodate for the delay through the third row of the previous convolver. Alternatively, the first programmable row buffer 42 in the next convolver may be programmed to have an additional three stages of delay as compared to the second row buffer 44. This is undesirable since it would require providing two different end of row registers 46 and storing two different values requiring additional programing cycles.

Figure 2C:
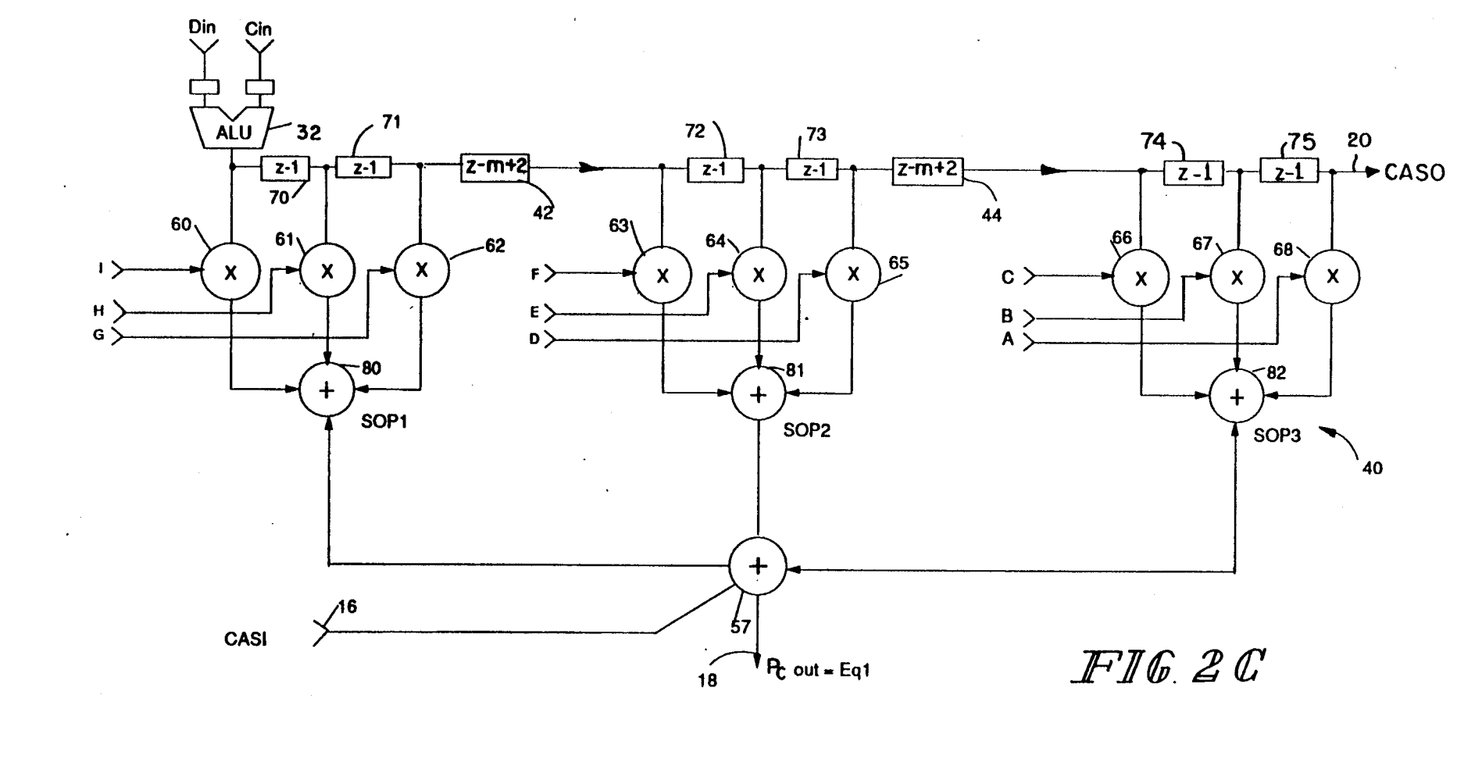
FIG. 2C is a functional diagram of another embodiment of a $3 \times 3$ convolver of the present invention.

An alternative to FIG. 2B is illustrated in FIG. 2C. The buffers 70 through 75 of the individual stages connected to the first input of the multiplier of its row are cascaded and represent only one stage of delay. This is distinguished from FIG. 2B wherein the third multiplier in each row includes two stages of delay. Thus the output of each row represents the delay through the row and the cascade output CASO at port 20 represents the total delay through the convolver 10. The value stored in the row buffers 42 and 44 will then represent the delay of the row size of the pixel frame minus two delays which are now inherent in the multiplier matrix.

Figure 4:
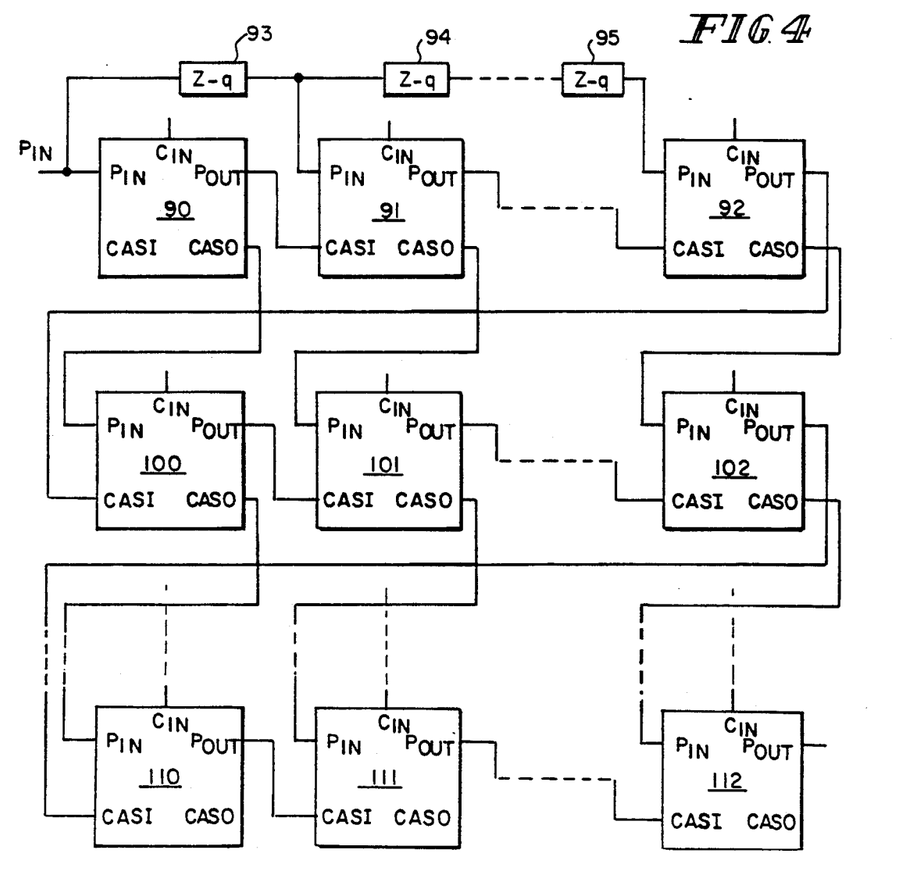
FIG. 4 is a block diagram of the convolver of FIG. 1 arranged in an array of rows and columns to provide a kernel larger than that of the individual convolver as well as handling larger input arrays.

External buffers may be used with larger frames which include more pixels per row than the programmable capacity of the programmable row buffers 42 and 44. The external connection is illustrated in FIG. 3A and the modification of the data flow within the multiplier matrix 40 is illustrated in FIG. 3B. Although larger frames can also be accommodated by cascading multiple convolvers 10 as illustrated in FIG. 4, the use of external row buffers using a single convolver 10 may offer a cost saving alternative. The pixel input is provided to input port 12 and to a first external row buffer 86. The output of external row buffer 86 is provided to the least significant eight bits CASIA at port 16A and to the second row buffer 88 whose output is provided to the most significant eight bits CASIB at cascade input port 16B. The value of the delay of the row buffers 86 and 88 may be programmable and represents the length of the rows or lines in the pixel frame array, since the internal programmable row buffers 42 and 44 are not used in the multiplier matrix 40.

When the first bit in the instruction register 38 is a one indicating external row delays, the multiplexers 48 and 50 provide the inputs on CASI bus 16A and 16B to the second and third rows respective of the multiplier matrix as illustrated in FIG. 3B. The output from the ALU 32 is provided to the first row multipliers 60, 61 and 62 without row delay and with the appropriate delay between the elements within the row. The output of the first external row buffer 86 on port 16A is provided to the second row of multipliers 63, 64 and 65 with the appropriate intra-row delays. The output from the second external row buffer 88 on port 16B is provided to the third row multiplier 66, 67, and 68 with the appropriate intra-row delays. The output of the summers 80, 81 and 82 are provided to the final adder 57 to produce a convolved output Pcout at port 18 represented by Equation 2.

Since the cascade input CASI 16 is used to provide the data input to the second and third rows, the multiplexer 58 is programmed so as to provide no additional input to the final adder 57. The cascade output CASO still represents the delay through the internal row buffers 42 and 44 since they are not disabled even though they are not providing the input to the second and third rows. These registers may be programmed to various values to produce various effects.

To illustrate the operation of convolver 10, a 3×3 kernel of a 1k×1k frame will be described. The cycle begins with a reset signal on RSB port to reset all the internal circuitry as well as clearing all the internal storage registers. A logic signal is provided to the chip select port CSB enabling the load strobe port LDB.

The series of addresses at port A are provided with the load strobe signal LDB to program the various registers within the convolver 10 as shown in Table 3. The end of row register 46 is loaded with the value of 1024 for the 1k×1k frame. This may be, for example, the full capacity of the programmable row registers 42 and 44 and in the examples to be discussed will be considered the capacity of the internal row buffers. Appropriate ALU microcodes are loaded in the AMC register 36. The instruction register 38 is loaded with the appropriate bits with the first bit being a zero for internal row buffers, the second and third bits being 0 for 0 input delays. The fourth, fifth sixth and seventh bits are set for the appropriate number format and type of rounding to be performed. The eighth and ninth bits ar set to zero since no cascade input is used.

If the clock input CLK is running during the loading, the HOLD port may be held high to prevent the clock from effecting the internal circuitry.

The coefficient registers CRE00 52 and CREG1 54 are provided with appropriate coefficients. The coefficients are loaded serially such that the user is responsible for loading them in the correct order. This eliminates the need to generate address values for the coefficient register locations.

After the coefficients are loaded, the HOLD pin is disabled. Once all the registers have been loaded with the appropriate data, the data is accepted on the pixel input 12 in a non-interlaced raster scan order at a rate of one pixel per clock cycle. Thus the new convolved pixel value Pcout is available on the output port 18 after the third pixel of the third row has been received. All outputs previous to this cycle have no useful value, but are predicted by equation 2.

During the convolution, a second set of coefficients may be loaded without disturbing the current processing. The user would simply load the new coefficients using the Cin port 14, the appropriate address for control A and the chip select CSB and the load strobe LDB. The new set of coefficients may be selected by simply providing the appropriate function on input A.

To initialize for the next frame, the FRAME input is activated, which resets all the internal circuitry except for the coefficient registers 52 and 54, the ALU register 34, the microcode register 36, the instruction register 38 and the end of row register 46.

By programming the length of the row buffers 42 and 44 smaller frames may be accommodated. If the depth of the programmable buffers 42 and 44 are set to a value of three, the convolver 10 becomes one dimensional or 9×1 convolution.

To handle larger kernels greater than the 3×3 of the multiplier matrix, as well as larger frames beyond the limit of the row buffers 42 and 44, the convolver 10 may be connected with or cascaded with other convolvers 10. As illustrated in FIG. 4, an array of convolvers 10 are shown having a first row 90, 91 ... 92, a second row 100, 101 ... 102 and an Nth row 110, 111 ... 112. In the array, each of the convolvers are set for internal row buffer by the first bit of the instruction register 38. Each convolver is also loaded with its own coefficients.

Within each row, the convolved output Pcout of one convolver is connected to the cascade input CASI of the subsequent convolver in that row. The Pcout output of the last convolver in a row is connected to the CASI input of the first convolver of the next row. Thus the output of the last convolver 112 of the array is the total convolved signal Pc.

The pixel input Pin is provided to the input terminal of the first convolver 90 directly and to subsequent convolvers 91, 92 through appropriate buffers 93, 94 ... 95. The number stage of the delay of the buffers is equal to the row length of the individual convolvers. Using the example above, this would be three delays if the convolvers were 3×3. Although the buffer 95 is illustrated as being external of the convolvers 92 it preferably represents the programmable input buffers 24, 26 and 28 of the convolver 10 of FIG. 1. By providing an additional output at Din of FIG. 1, all the buffers 93, 94 ... 95 can be internal and programmed for the appropriate delay. Realizing that the use of these programmable input buffers 24, 26 and 28 are useful in the cascading environment, the number of input buffers should equal the number of elements in a row of the multiplier matrix 40. Also by providing these in each of the convolvers 10, a single convolver may be used for all of the cascaded convolvers in the array of FIG. 4.

The cascade output CASO of each of the convolvers are connected to the data or pixel input Pin of the subsequent convolver within its column of the array. Thus for example, the CASO output of convolver 90 is connected to the Pin input of convolver 100. Assuming the structure of FIGS. 1 and 2B, the first row of each of the convolvers 100 ... 102 ... 110 ... 112 of all but the first row 90 ... 92 are loaded with coefficient of zero since they do not have a row buffer programmable to the length of a row of the frame. Alternatively, programmable row buffers could be provided at the input Pin of convolvers 100 ... 102 ... 100 ... 112 or internally. Providing the programmable row buffer internally for all but the first row of convolvers will not make them interchangeable with the first row of convolvers.

Figures 5A, 5B:
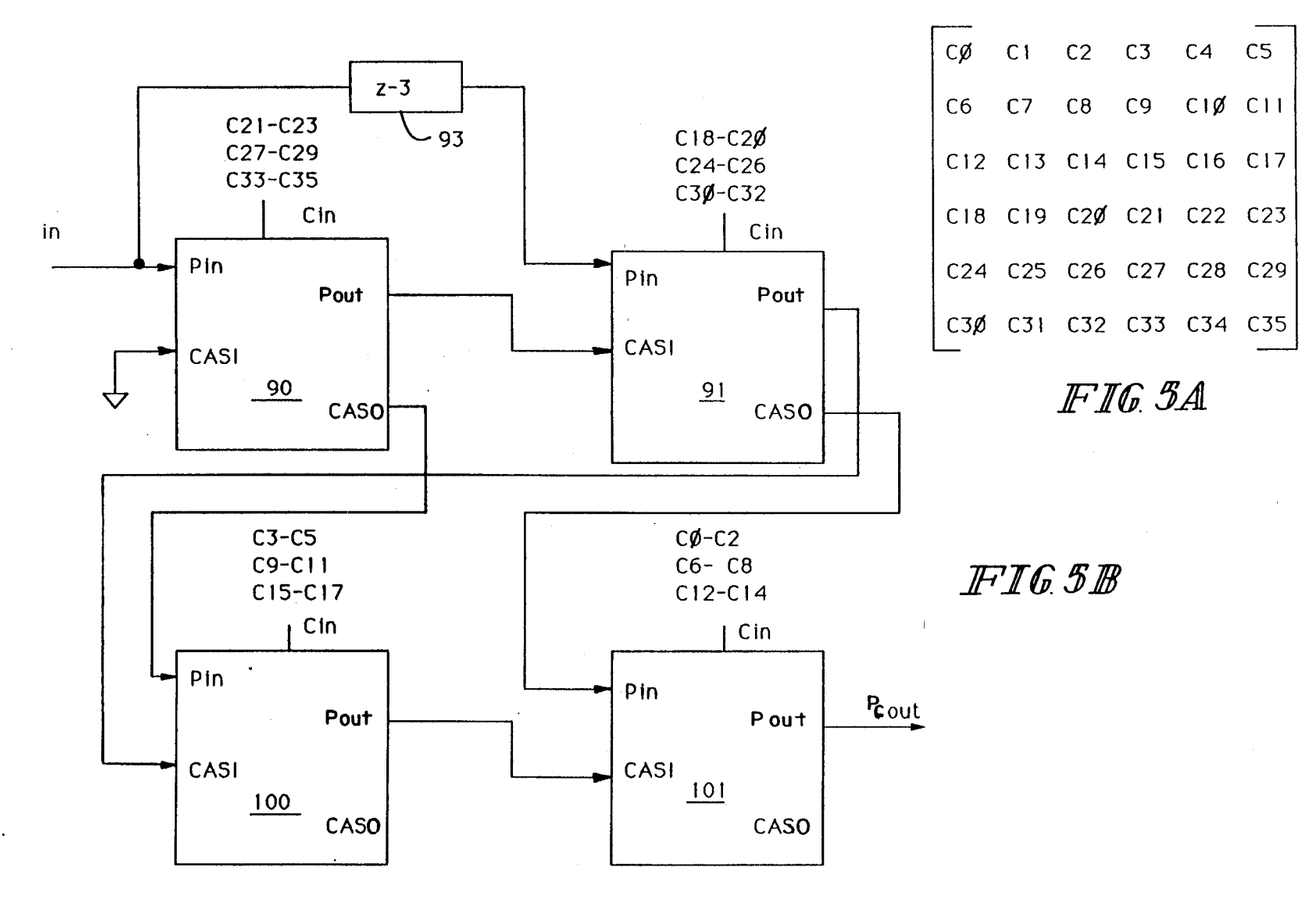
FIG. 5A is a coefficient mask for a $6 \times 6$ kernel convolution.
FIG. 5B is a block diagram of convolvers of FIG. 1 for a $6 \times 6$ kernel convolution.

An example of a 6×5 kernel convolution is illustrated in FIG. 5B with the mask coefficients of FIG. 5A. Although the mask of FIG. 5A appears as a 6×6 kernel convolution, the structure of convolvers 90, 91, 100 and 101 can only provide a 6×5 convolution since the extra frame row delay is not provided as previously described. Therefore, the coefficients for the first row of convolvers 100 and 101 must be as shown in Table 4. If external programmable row buffers are provided for convolvers 100 and 101, a 6×6 kernel is possible.

TABLE 4

| A | B | C | D | E | F |
|---|---|---|---|---|---|
| G | H | I | J | K | L |
| 0 | 0 | 0 | 0 | 0 | 0 |
| M | N | O | P | Q | R |
| S | T | U | V | W | X |
| Y | Z | A' | B' | C' | D' |

The pixel is provided to the inputs Pin of convolver 90 and through a three stage delay 93 to convolver 91. The output Pout of 90 is provided to the cascaded input CASI of convolver 91 and the cascade output CASO is provided to the input Pin of convolver 100. The output Pout of convolver 91 is provided to input CASI of convolver 100 and output CASO is provided to the Pin of convolver 101. The output Pout of convolver 100 is provided to the CASI input of 101. The output Pout of convolver 101 is the sum of the total convolution of the 6×5 kernel convolver. As with FIG. 4, since the convolvers 100 and 101 of FIG. 5B receive at their pixel input cascade outputs of previous stages within their column.

Comparing the coefficient inputs to the convolvers 90, 91, 100 and 101 it is noted that, the top left hand 3×3 coefficient map is provided to convolver 101, the top right 3×3 coefficient to convolver 100, the bottom left 3×3 to convolver 91 and the bottom right 3×3 to convolver 90. As noted above C∅ through C5 are set to zero. Although the structure of FIG. 5B has a maximum kernel of 6×5, it may be programmed without structural modification for smaller kernels. For example, to provide a 5×5 kernel the map of FIG. 5A would be that of Table 5.

TABLE 5

| 0 | A | B | C | D | E |
|---|---|---|---|---|---|
| 0 | F | G | H | I | J |
| 0 | 0 | 0 | 0 | 0 | 0 |
| 0 | K | L | M | N | O |
| 0 | P | Q | R | S | T |
| 0 | U | V | W | X | Y |

This will result in the coefficients provided to the four convolvers as shown in Table 6. Thus the ability to change the kernel by merely providing the appropriate coefficients can be achieved with the same structure.

TABLE 6

| Top left 90: | MNORSTWXY | Top right 91: | 0KL0PQ0UV |
|---|---|---|---|
| Bottom left 100: | CDEHIJ000 | Bottom right 101: | AB0FG0000 |

Figures 6A, 6B:
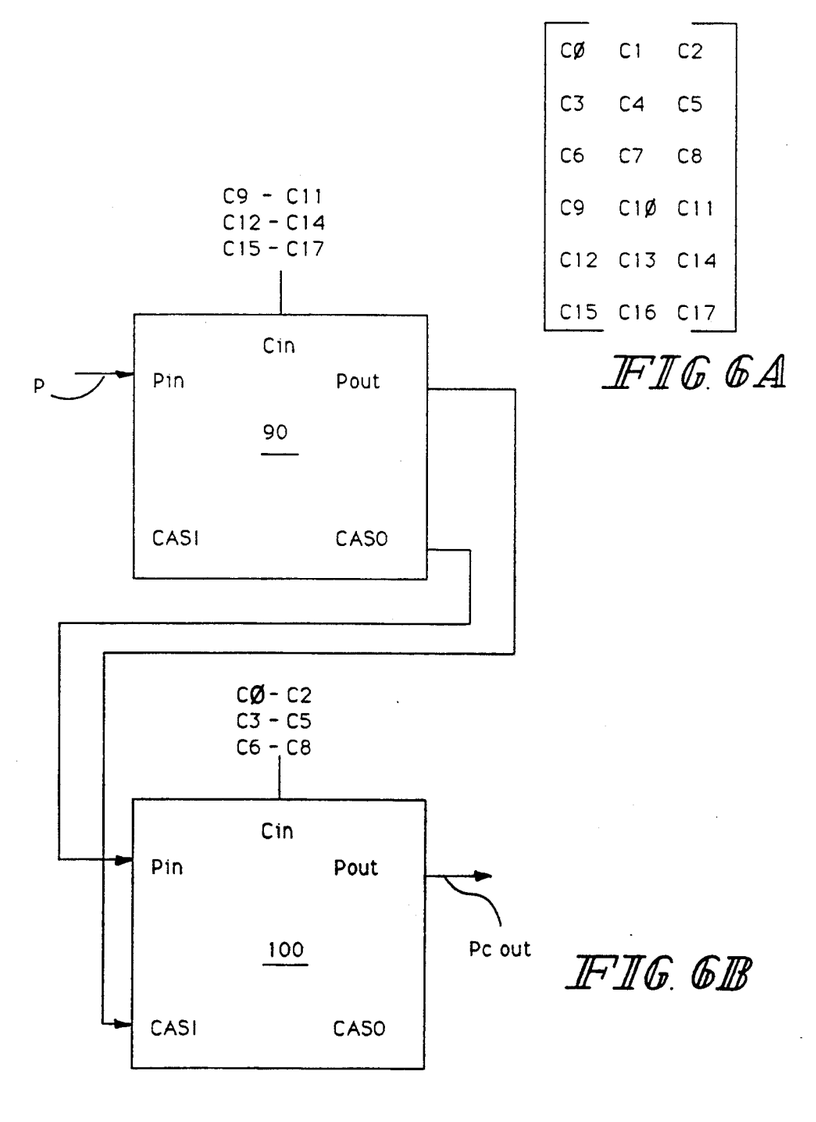
FIG. 6A is a map for a $3 \times 6$ kernel convolution.
FIG. 6B is a block diagram of convolvers of FIG. 1 connected in a $3 \times 6$ kernel convolution.

A non-symmetrical kernel may also be provided with the present structure as illustrated in the map of FIG. 6A and the structure of 6B. This convolver system is a 3×5 kernel wherein the first convolver 90 receives the pixel input an its Pin and provides its output Pout, to the cascade input CASI of convolver 100. The cascade output CASO of convolver 90 is provided at the input Pin of convolver 100. The output Pout of convolver 100 is the complete convolution output Pcout. The coefficients provided to the convolver 90 are the bottom 3×3, and the coefficients provided to the convolver 100 are the top 3×3.

As in FIGS. 4 and 5B, since the convolver 100 of FIG. 6B receives the cascade output CASO from convolver 90 as its data input at Pin, the three coefficients C0, C1 and C2 are set to zero.

The coefficients of the first is set convolver 90 to: GHIJKLMNO, and the other convolver 100 is set to: ABCDEF000. This assumes the coefficient mask of Table 7.

TABLE 7

| A | B | C |
|---|---|---|
| D | E | F |
| 0 | 0 | 0 |
| G | H | I |
| J | K | L |
| M | N | O |

The structure of FIG. 6B may also be used as a 3×3 convolution on a 2k×2k frame instead of using external buffers as in FIG. 3A. This double length of row is achieved by causing the pixel to pass through two internal row buffers instead of one. To accomplish this, the coefficients for the convolver 90 would be DEF000 GHI and the coefficients for the convolver 100 would be ABC000000 as shown in Table 8.

TABLE 8

| A | B | C |
|---|---|---|
| 0 | 0 | 0 |
| 0 | 0 | 0 |
| D | E | F |
| 0 | 0 | 0 |
| G | H | I |

This is possible since the cascade output CASO from convolver 90 only has two rows of frame delay and not three rows of frame delay. Thus the cascade output CASO of convolver 90 is in time sequence to that provided to the third row of the convolver 90 for coefficients D, E and F. By placing the coefficients A, B, C in the last row of convolver 100, the appropriate double row delay is achieved to handle the 2k row frame.

Figure 7:
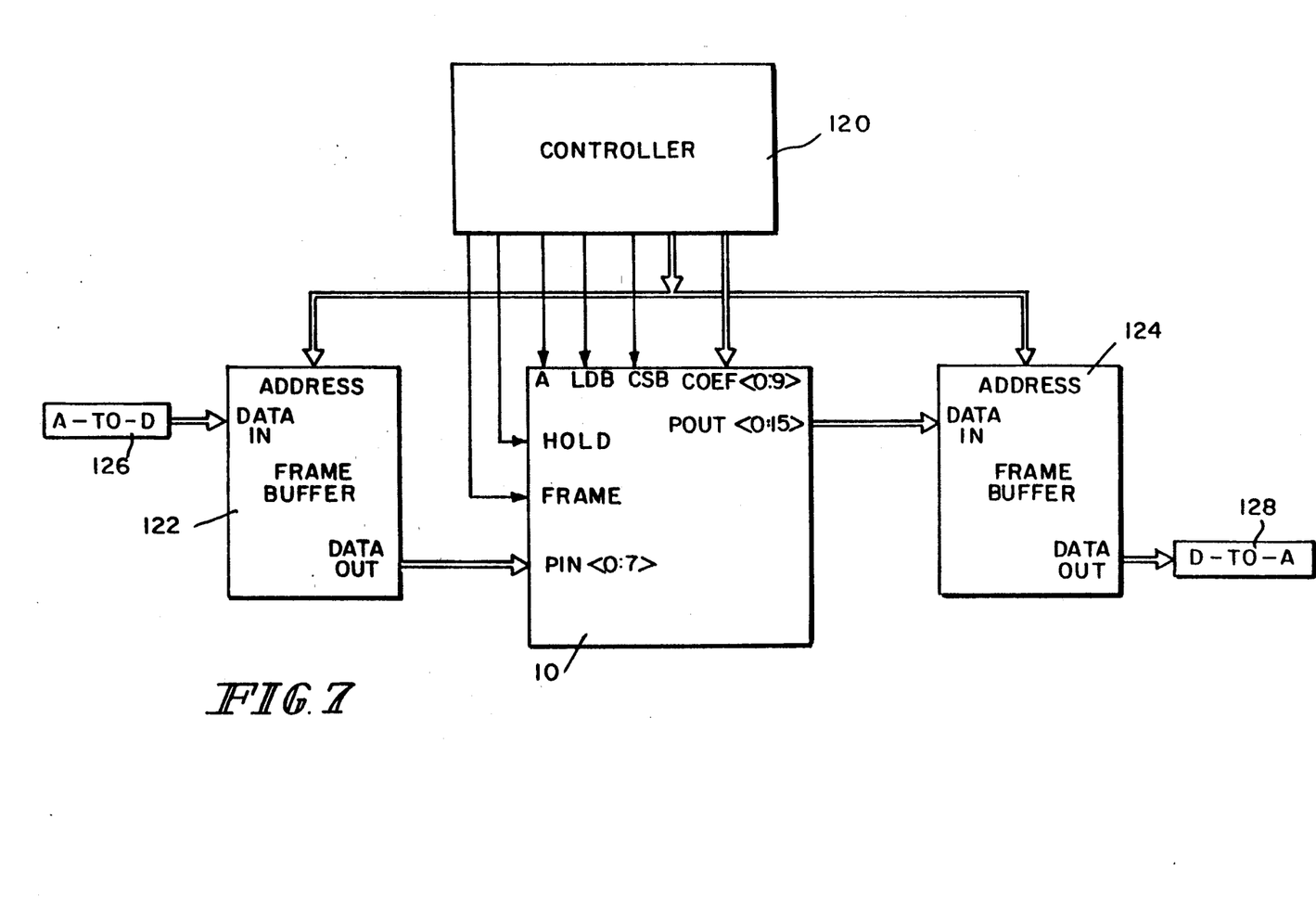
FIG. 7 is a block diagram of the use of the convolver of FIG. 1 with a controller.

Since the convolver 10 of FIG. 1 is a data-in, data-out machine with little control over the system from which it receives its pixel data, it interfaces well with a controller such as a controller sold under the trademark RTX by Harris Semiconductor. As illustrated in FIG. 7, the controller 120 provides a coefficient input to the convolver 10 using its ASIC bus as well as control signals to ports A, LDB and CSB to load the coefficients with the row size desired and all other programmable features related to the address A using other bus lines. The controller 120 also controls an input or frame buffer 122 which receives its input from an A to D converter and output frame buffer 124 whose outputs are provided through an output D to A converter 128.

The controller 120 controls the loading of pixel data from the input frame buffer 122 by generating an Area Of Interest (AOI) address and send theses pixels to the convolver 10 for processing. The results of the pixel convolution are sent to the output frame buffer 124 for storage and/or display. AOI processing is used often in image analysis, particularly when a very large frame of data, such as a 2k×2k, is available but only a small portion of the frame is needed for analysis. By performing the AOI operation, much computing time is saved by not wasting clock cycles on the entire region. This is just a typical example of a type of control that can be used with the convolver 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for Q×R kernel convolution of an M×N array of words, where Q×R is a subset of M×N comprising:
    input means for receiving, in sequence, words P from said M×N array;
    coefficient means for storing coefficients $C_1$ through $C_{Q \times R}$;
    Q×R matrix of multiplying means, each multiplying means having a first input receiving Pi and a second input receiving a dedicated Cj for producing a product PiCj where i varies from 1 to M×N and j is one of 1 to Q×R;
    said first input of each of said multiplying means is connected to a first input of a preceding multiplying means in its respective row of a one stage buffer means;
    said first input of a first multiplying means in each row is connected to a first input of a last multiplying means of a previous row by a row buffer means having M−R+1 stages; and
    adder means connected to said Q×R matrix of multiplying means for adding said products PiCj to providing an output convolution Pc as a first output.

2. A system according to claim 1 wherein said row buffer means is programmable for different values of M.

3. A system according to claim 1 including:
    second input means for receiving R−1 words P; and
    a plurality of multiplexer means each having a first input from said second input means and a second input from a row buffer means and an output connected to a first input of a first multiplying means of a respective row.

4. A system according to claim 3 including means for selectively connecting said second input means to said adder means.

5. A system for Q×R kernel convolution of an M×N array of words, where Q×R is a subset of M×N, comprising:
   input means for receiving, in sequence, words P from said M×N array;
   coefficient means for storing coefficient $C_1$ through $C_{Q \times R}$;
   Q×R matrix of multiplying means, each multiplying means having a first input receiving Pi and a second input receiving a dedicated Cj for producing a product PiCj where i varies from 1 to M×N and j is one of 1 to Q×R;
   a plurality of buffer means each connecting said input means to a respective multiplying means first input for storing one or more words P and delaying inputting of Pi to a respective multiplying means as a function of its position in said Q×R matrix and the row length M of said M×N array;
   an ALU means connected between said input means and said plurality of buffer means for performing arithmetical and logical operations on said words P before being inputted to said plurality of buffer means; and
   adder means connected to said Q×R matrix of multiplying means for adding said products PiCj to providing an output convolution Pc as a first output.

6. A system according to claim 5 wherein said plurality of buffer means includes:
   row buffer means connected to a first multiplying means of a row and having a plurality of stages as a function of row length M; and
   other buffer means connected to said multiplying means other than said first multiplying means of a row and having a number of stages as a function of its position in its row.

7. A system according to claim 6, wherein said row buffer means is programmable for different values of M and the other buffer means are a fixed number of stages.

8. A system according to claim 7, wherein said system is convertible to a (Q×R)×1 convolution by programming said row buffers to Q stages.

9. A system according to claim 6 including:
   second input means for receiving R−1 words P; and
   a plurality of multiplexer means each having a first input from said input means and a second input from said row buffer means and an output connected to a first input of a first multiplying means of a respective row.

10. A system according to claim 9 including means for selectively connecting said second input means to said adder means.

11. A system according to claim 5 including second input means for receiving and storing a second word; and
   wherein said ALU means includes a first input connected to said input means and a second input connected to said second input means, and said ALU means performs arithmetical and logical operations on both said words P and said second word.

12. A system according to claim 5 wherein said coefficient means includes a first and second coefficient means for storing first and second groups of coefficients and a multiplexer means for connecting one of said coefficient means to second inputs of said multiplying means.

13. A system according to claim 5 including:
   second input means connected to said adder means; and
   second output means connected to an output buffer means whose output Pd represents a given number of stages of delay.

14. A system according to claim 13 wherein:
   said output buffer means is programmable to adjust said given number of stages of delay; and
   said first mentioned input means includes an input buffer means programmable to different numbers of stages of delay.

15. A system according to claim 14 wherein said plurality of buffer means includes:
   row buffer means connected to a first multiplying means of a row and having a plurality of stages as a function of row length M;
   other buffer means connected to said multiplying means other than said first multiplying means of a row and having a number of stages as a function of its position in its row; and
   said output buffer means is a row buffer means of a last row Q.

16. A system according to claim 5 including
   programming input means for receiving programming data;
   address means for receiving addresses and determining the destination of said programming data;
   said address means directs coefficients from said programming input means to said coefficient means by an appropriate address.

17. A system according to claim 16 wherein said coefficient means stores two sets of coefficients and said address means selects one or the other sets of coefficient to be provided to said multiplying means by an appropriate address.

18. A system according to claim 16 an ALU means connected between said input means and said multiplying means for performing arithmetical and logical operations on said words P before being inputted to said multiplying means; and
   wherein said address means directs microcode from said programming input means to said ALU means.

19. A system according to claim 18,
   including an ALUR means for storing a second word from said programming input means;
   wherein said ALU means includes a first input connected to said input means and a second input connected to said ALUR means; and
   wherein said address means directs said second word from said programming input means to said ALUR means.

20. A system according to claim 16 including instruction means for storing an instruction word which provides control of said system; and
   wherein said address means directs instruction words from said programming input means to said instruction means.

21. A system according to claim 20 wherein said instruction word includes bits for output rounding and number formats.

22. A system according to claim 20 including second data input means for selectively providing second input data to said multiplying means and said adder means; and
   wherein said instruction word includes a bit for controlling said second data input means.

23. A system according to claim 20 including input buffer means programmable to different number of stages of delay; and wherein said instruction word includes bits for programming said input buffer means.

24. A system according to claim 16 wherein said plurality of buffer means includes row buffers means programmable to different values of M; and said address means directs values of m from said programming input means to said row buffer means for programming.

25. A system for $Q \times R$ kernel convolution of an $M \times N$ array of words, where $Q \times R$ is a subset of $M \times N$, comprising:

first input means for receiving, in sequence, words P from said $M \times N$ array;

coefficient means for storing coefficients $C_1$ through $C_{Q \times R}$;

$Q \times R$ matrix of multiplying means, each multiplying means having a first input receiving Pi and a second input receiving a dedicated Cj for producing a product PiCj where i varies from 1 to $M \times N$ and j is one of 1 to $Q \times R$;

$R-1$ row buffer means each connecting said first input means to a respective row of multiplying means first input for storing one or more words P and delaying inputting of Pi to a respective multiplying means as a function of its position in said $Q \times R$ matrix and the row length M of said $M \times N$ array;

second input means for receiving $R-1$ words P;

a plurality of multiplexer means each having a first input from said second input means and a second input from a row buffer means and an output connected to a first input of a respective row of said multiplying means;

adder means connected to said $Q \times R$ matrix of multiplying means for adding said products PiCj to proving an output convolution Pc as a first output; and selection means for selectively connecting said second input means to either said multiplexing means or said adder means.

26. A system according to claim 25 including $R-1$ external buffers connected to said second input means, each of said external buffers having a greater capacity than said row buffer means.

27. A system according to claim 25 including a summing means, for each row R, for providing a sum of products PiCj of its respective row to said adder means; and wherein said adder means adds said sums from said summing means to provide said output convolution Pc.

28. A system according to claim 27 including a second input means for receiving additional sums and said adder means is connected to said second input means.

29. A system for $Q \times R$ kernel convolution of an $M \times N$ array of words where $Q \times R$ is a subset of $M \times N$ comprising:

input means for receiving, in sequence, words P from said $M \times N$ array;

coefficient means for storing coefficients $C_1$ through $C_{Q \times R}$;

$Q \times R$ matrix of multiplying means, each multiplying means having a first input receiving Pi and a second input receiving a dedicated Cj for producing a product PiCj where i varies from 1 to $M \times N$ and j is one of 1 to $Q \times R$;

a plurality of buffer means each connecting said input means to a respective multiplying means first input for storing one or more words P and delaying inputting of Pi to a respective multiplying means as a function of its position in said $Q \times R$ matrix and the row length M of said $M \times N$ array;

adder means connected to said $Q \times R$ matrix of multiplying means for adding said products PiCj to proving an output convolution Pc as a first output; and frame reset means for resetting said matrix of multiplying means, said buffer means and said adder means and not said coefficient means.

30. A system according to claim 29 including reset means for resetting said coefficient means, said multiplying means, said buffer means and said adder means.

31. A system according to claim 29 wherein said buffer means have programmable length and said frame reset means resets said buffer means content without resetting its programmable length.

32. A system according to claim 29 including clock input means for receiving a clock pulse which determines the processing rate and a hold input means for enabling or disabling said clock input means.

33. A system for $S \times T$ kernel convolution of an $M \times N$ array of words where $S \times T$ is a subset of $M \times N$ comprising:

a plurality of $Q \times R$ capacity convolvers, where $Q \times R$ is a subset of $S \times T$, each having a data input, coefficient input, a cascade input connected to an output adder of said convolver, a product output from said output adder and a cascade output providing delayed input data;

said convolvers being arranged in rows and columns;

a cascade input of each convolver being connected to a product output of a previous convolver in its respective row, and the cascade input of a first convolver of each row being connected to a product output of a last convolver of a previous row;

a data input of each convolver being connected to cascade output of a previous convolver in its respective column, and the data output of convolvers of a first row are connected to the data input of a first convolver of said first row by delay means.

34. A system according to claim 33 wherein each convolver includes a said delay means programmable between zero and Q stages of delay.

35. A system according to claim 33 wherein each convolver includes row buffer means programmable for different values M.

* * * * *